United States Patent [19]

Ito et al.

[11] Patent Number: 4,723,519
[45] Date of Patent: Feb. 9, 1988

[54] IGNITION TIMING CONTROL SYSTEM FOR AN INTERNAL COMBUSTION ENGINE

[75] Inventors: Toshimitsu Ito, Okazaki; Akira Mori, Kobe, both of Japan

[73] Assignees: Toyota Jidosha Kabushiki Kaisha, Toyota; Fujitsu Ten Limited, Kobe, both of Japan

[21] Appl. No.: 874,849

[22] Filed: Jun. 16, 1986

[30] Foreign Application Priority Data

Jun. 17, 1985 [JP] Japan .................. 60-129903

[51] Int. Cl.$^4$ .......................... F02P 5/10; F02P 5/15
[52] U.S. Cl. ........................ 123/416; 123/488
[58] Field of Search ............... 123/415, 416, 417, 488, 123/494

[56] References Cited

U.S. PATENT DOCUMENTS 4,412,520 11/1983 Mitsuyasu et al. ............... 123/488
4,633,839 1/1987 Yasuoka et al. ............... 123/494 X

FOREIGN PATENT DOCUMENTS 46305 2/1982 European Pat. Off. ............ 123/416
3011892 10/1981 Fed. Rep. of Germany ...... 123/417
38642 3/1982 Japan .................................. 123/416
2120406 11/1983 United Kingdom ............... 123/494

*Primary Examiner*—Tony M. Argenbright
*Attorney, Agent, or Firm*—Cushman, Darby & Cushman

[57] ABSTRACT

An ignition timing control system mounted at an internal combustion engine, particularly, a non-surge tank type engine, is constituted by a crank angle sensor, an engine rotational speed sensor, an intake pipe air pressure sensor, and a microcomputer. In the microcomputer, an intake pipe air pressure correction unit for calculating a correction term and for obtaining a corrected intake pipe air pressure value, an optimal advanced angle calculation unit for obtaining an optimal advanced crank angle based on a control map having an optimal advanced angle between the corrected intake pipe air pressure and the engine rotational speed, and an ignition command unit for commanding an ON/OFF timing of a primary current of an ignition coil, are provided.

6 Claims, 14 Drawing Figures

IGNITION TIMING CONTROL SYSTEM FOR AN INTERNAL COMBUSTION ENGINE

BACKGROUND OF THE INVENTION

1. Field of the Invention

The present invention relates to an ignition timing control system for an internal combustion engine, and, more particularly, it relates to an ignition timing control system controlled by an optimal advanced angle for an ignition mainly depending on an intake pipe air pressure (below:intake pressure) and an engine rotational speed.

2. Description of the Related Art

A conventional technique is known regarding an ignition timing control based on the advanced angle for the ignition. That is, the ignition timing is determined by the optimal advanced angle calculation based on the intake pressure and the engine rotational speed by using a microcomputer. Usually, the intake pressure is detected by a pressure sensor mounted at an inner side between an intake valve of a cylinder and a throttle valve in an intake manifold. The rotational speed is detected by various known methods, for example, by a crank angle position sensor.

In general, the intake pressure changes pulsatively with time even if an aperture (opening angle) of the throttle valve is constant. This is because this pressure is strongly influenced by the opening and closing action of the intake valve. To reduce or eliminate these pressure pulsations causing engine knocking, a surge tank is, in general, provided at the intake manifold. Since the surge tank has a predetermined capacity, for example, one and a half times that of an exhaust quantity in the intake manifold, the pressure pulsations can be reduced or eliminated based on this capacity. That is, the surge tank functions as a mechanical filter for absorbing the pressure pulsations.

Several problems arise, however, regarding this solution. For example, provision of the surge tank reduces the responsiveness of various operations since this pulsation appears particularly when the intake pressure changes from a low level to a high level during acceleration. Also in some cases, the surge tank is not provided at the intake manifold in order to improve the responsiveness. An engine of this type, i.e., a non-surge tank type engine, is called a carburetor type engine. In the carburetor type engine, although the responsiveness can be improved, the pressure pulsation becomes larger than for the surge tank type engine, because the intake manifold capacity is small.

Consequently, a satisfactory ignition timing control system having countermeasures against pressure pulsation occurring during the transient time of the intake pressure, i.e., during acceleration, has not been proposed as yet.

SUMMARY OF THE INVENTION

The object of the present invention is to provide an improved ignition timing control system for an internal combustion engine, particularly, for a non-surge tank type engine, enabling an improvement of the responsiveness and a reduction of engine knocking, particularly during acceleration, by reducing a pressure pulsation contained in an intake pipe air pressure in an intake manifold.

In accordance with the present invention, there is provided an ignition timing control system for an internal combustion engine, particularly a non-surge tank type engine, including a crank angle sensor for detecting crank angles; an engine rotational speed sensor for detecting engine rotational speed; an intake pipe air pressure sensor for detecting air pressure in an intake manifold; an intake pipe air pressure correction means for calculating a correction term and for obtaining a corrected intake pipe air pressure value; an optimal advanced angle calculation means for obtaining an optimal advanced angle based on a control map having the optimal advanced angle between the corrected intake pipe air pressure and the engine rotational speed; and an ignition command means for commanding an ON/OFF timing of a primary current of an ignition coil.

DESCRIPTION OF THE PREFERRED EMBODIMENTS

An ignition timing control system for an internal combustion engine will be explained in detail hereinafter.

Figure 1:
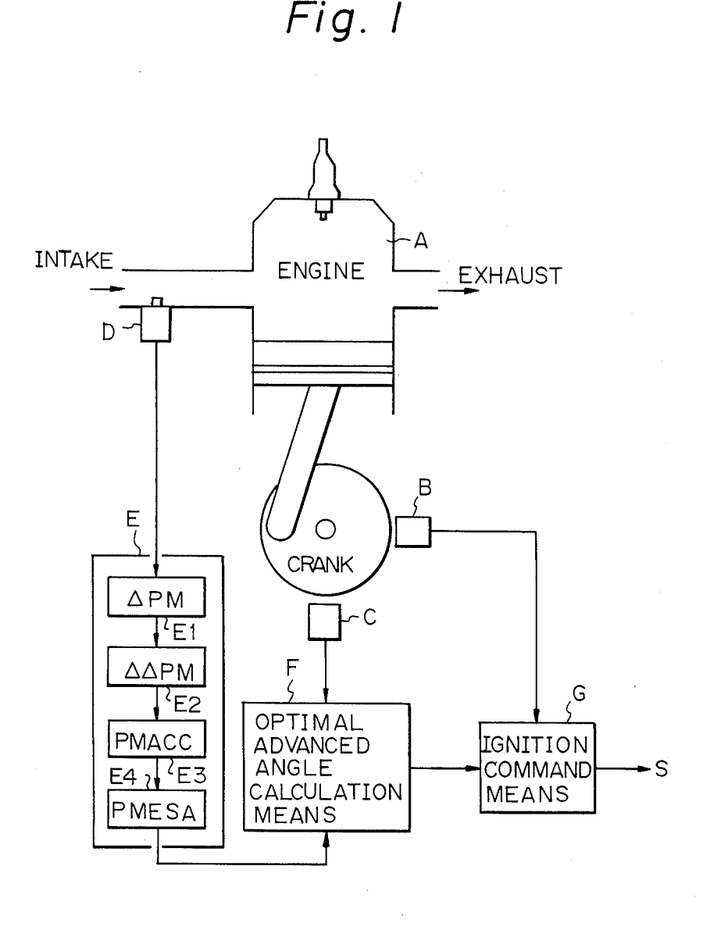
FIG. 1 is a schematic block diagram of an ignition timing control system according to an embodiment of the present invention.

Referring to FIG. 1, Reference letter A represents an engine, B a crank angle sensor, C an engine rotational speed sensor, D an intake pressure sensor, E an intake pressure correction means, F an optimal advanced crank angle calculation means, and G an ignition command means.

Figure 2:
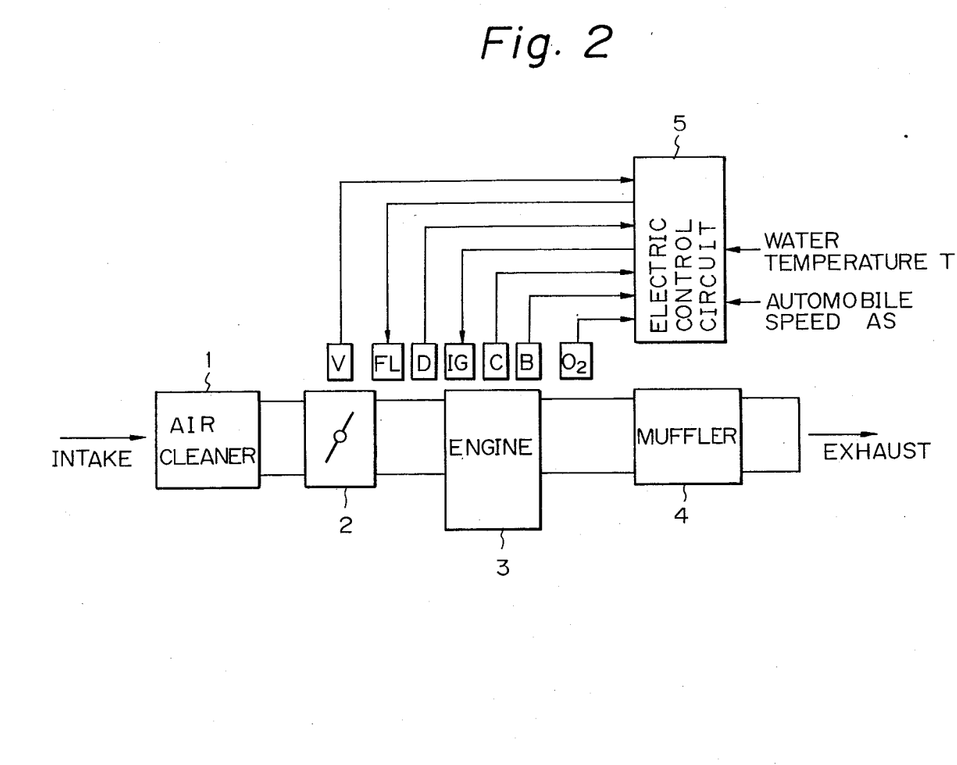
FIG. 2 is a schematic block diagram of an engine and peripheral apparatus including the system shown in FIG. 1.

In these structures, means E, F, and G are included in an electric control circuit (microcomputer) 5 shown in FIG. 2. In detail, the means E comprises a first difference value calculation means E1 to obtain each difference value $\Delta PM$ before and after each period of digitalized intake pressures, a second difference value calculation means E2 to obtain a difference value $\Delta\Delta PM$ before and after the above first difference value, a correction calculation means E3 to obtain a correction term PMACC from the above second difference value, and a corrected pressure calculation means E4 to obtain a corrected intake pressure PMESA from the intake pressure including the correction value.

Referring to FIG. 2, reference numeral 1 represents an air cleaner, 2 a throttle valve, 3 an engine, 4 a muffler, and 5 the electric control circuit. Reference letter V represents a throttle valve sensor, T an engine cooling temperature sensor, $O_2$ an oxygen sensor, and AS an automobile speed. A fuel injection signal and an ignition signal are output from the electric control circuit 5 to a fuel injection nozzle FL and an ignitor IG.

Figure 3:
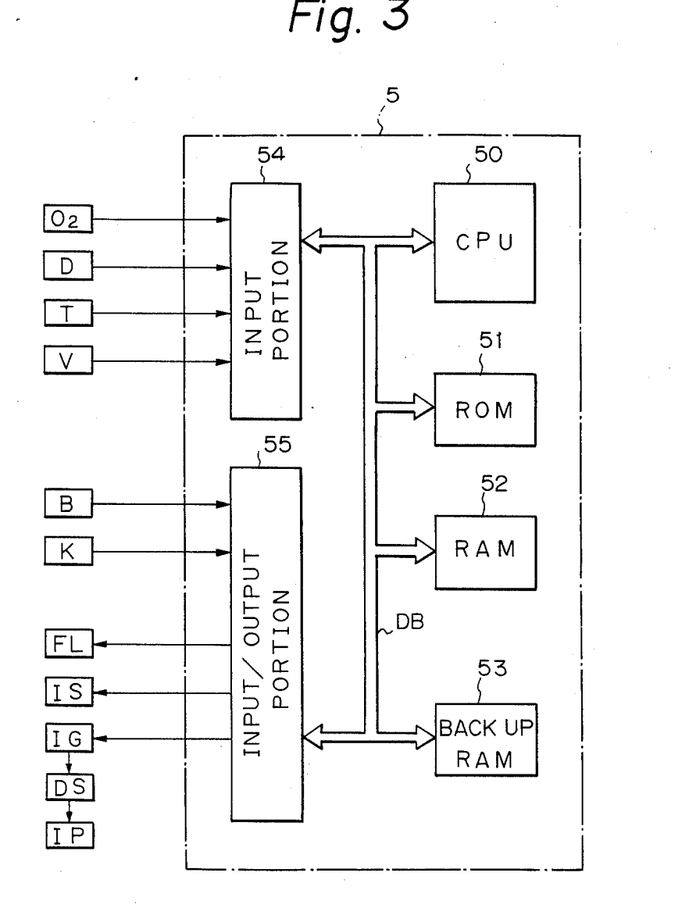
FIG. 3 is a detailed block diagram of the electric control circuit shown in FIG. 2.

Referring to FIG. 3, reference K represents a cylinder sensor provided in a distributor, IS an idle speed control valve, IG an ignitor, DS a distributor, and IP an ignition plug. The electric control circuit 5 is constituted by a microcomputer. This microcomputer comprises, in the form of hardware, a central processing unit (CPU) 50, a read only memory (ROM) 51, a random access memory (RAM) 52, a back up RAM 53, an input portion 54, and an input/output portion 55. These units are interconnected by a bus line DB. In the CPU 50, various calculations are carried out in accordance with the flow charts shown in FIGS. 6 and 7 (as will be described below), based on the various input sensor signals. A control map shown in FIG. 8 is stored in the ROM 51. The RAM 52 temporarily stores an optimal advanced crank angle and calculated data, and the back up RAM 53 stores various data for a learning control. In the input portion 54, various circuits, for example, input ports, waveform shaping circuit, multiplexer, and analog/digital converter, are provided, but these circuits are not shown in the input portion 54. Various circuits also are provided in the input/output portion 55, for example, input ports, output ports, and driver circuits for the ignitor, the injector, and the idle speed control valve. These circuits are not shown in the input/output portion 55 either.

Figure 4:
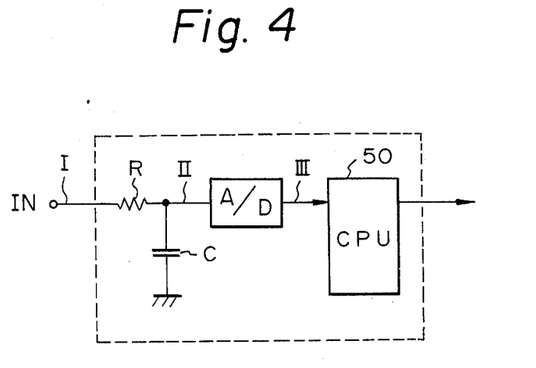
FIG. 4 is a detailed block diagram of a pressure pulsation filter according to the present invention.
Figure 5:
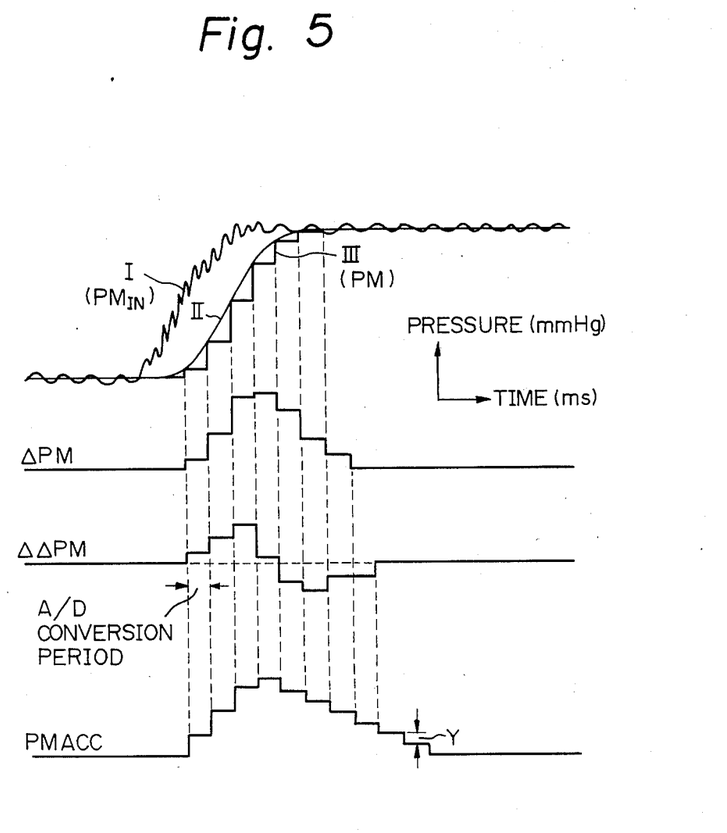
FIG. 5 shows waveforms for explaining intake pressure and a processing thereof according to the present invention.

Referring to FIG. 4, the intake pressure detected by the pressure sensor D is input to an input terminal IN. Signals I, II, and III are shown in FIG. 5. The input signal I is smoothed by an RC filter constituted by a resistance R and a capacitor C. The output signal II is converted to the digital signal III by an analog/digital converter (A/D). The digital signal III is input to the CPU 50. These circuits of the RC filter and the A/D converter are included in the input portion 54 shown in FIG. 3. Accordingly, this intake pressure ($PM_{IN}$) filter circuit is also included in the electric control circuit 5.

Referring to FIG. 5, the curve I shows the intake pressure $PM_{IN}$ detected by the pressure sensor D in the form of an analog signal. The intake pressure $PM_{IN}$ is rapidly raised from a low level to a high level. That is, this raising curve I shows a rapid acceleration state caused by the accelerator. The smoothed curve II is obtained through the RC filter shown in FIG. 4. In the present invention, the ignition timing control is achieved based on various processings of this smoothed curve II.

The curve III of the digitalized intake pressure is obtained through the A/D converter, and the first difference value $\Delta PM$ is given by the following formula:

$$\Delta PM(i) \leftarrow PM(i) - PM(i-2) \ldots \quad (1)$$

where, PM(i) shows a digitalized intake pressure "i". As is obvious from formula (1), it is preferable to use the value PM(i−2), which is indicated two steps from the value PM(i). This is to prevent a misjudgement of whether the pressure pulsation state or the accelerated state exists. The second difference value $\Delta\Delta PM$ is given by the following formula:

$$\Delta\Delta PM(i) \leftarrow \Delta PM(i) - \Delta PM(i-2) \ldots \quad (2)$$

In this case, however it is possible to use the value $\Delta PM(i-1)$ instead of the value $\Delta PM(i-2)$ because the problem of misjudgement has been solved in the first difference calculation step.

The correction term PMACC is given by the following formula:

$$PMACC \leftarrow PMACC + \alpha \cdot \Delta\Delta PM(i) \ldots \quad (3)$$

where, "$\alpha$" represents a correction factor. Accordingly, a corrected intake pressure value PMESA is given by the following formula:

$$PMESA \leftarrow PM + PMACC \ldots \quad (4)$$

These calculation procedures will be explained hereinafter.

Figure 6:
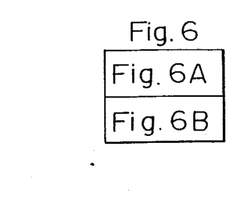
FIGS. 6, 6A and 6B are flow charts for explaining correction of the intake pressure.
Figure 6A:
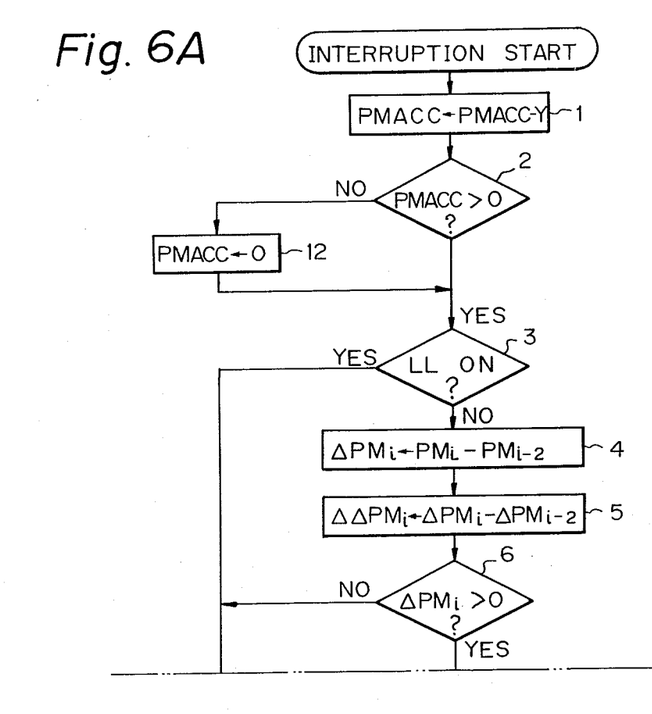
Figure 9:
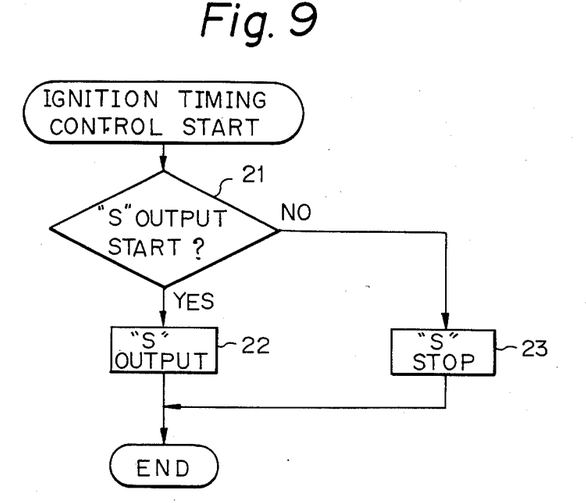
FIG. 9 is a flow chart for explaining a main routine of an ignition timing control.

Referring to FIG. 6, this routine interrupts a main routine of the ignition timing control shown in FIG. 9. This routine is carried out at predetermined periods, for example, 10 mseconds, as an interruption. In step 1, the calculation is performed to obtain the difference between the previous correction term PMACC obtained by the previous interruption routine and a pressure value "Y", where, "Y" is a constant pressure value determined by each system, for example, 30 mm Hg. The correction term PMACC is then judged as to whether it is positive or negative (step 2). When the result is negative ("NO"), the correction term PMACC is treated as zero (step 12). When the result is positive ("YES" in step 2), an idle switch (LL) state is judged as to whether it is ON or OFF (step 3). When the idle switch is turned ON, the procedure is advanced to step 13. When the idle switch is turned OFF, however, a correction is performed. That is, the first difference value $\Delta PM$ and the second difference value $\Delta\Delta PM$ are obtained in steps 4 and 5.

When the $\Delta PM$ is negative, the procedure is advanced to step 13. When the $\Delta PM$ is positive ("YES" in step 6), the engine rotational speed NE detected by the sensor C is compared with the predetermined speed X rpm, for example, 1000 rpm, (step 7). When the engine rotational speed NE is larger than the value X rpm, the second difference value $\Delta\Delta PM$ is compared with the predetermined reference value $LPM_1$ (step 8), and when the NE is smaller than the value X rpm, the $\Delta\Delta PM$ is compared with the other predetermined reference value $LPM_2$ (step 10), where the $LPM_1$ and $LPM_2$ are reference values determined by each system, for example, $LPM_1 = 15$ mm Hg, $LPM_2 = 7$ mm Hg. These values $LPM_1$ and $LPM_2$ are also determined in correspondence with the predetermined speed X rpm. Namely, because a lower engine rotational speed gives a correspondingly larger pressure pulsation, it is necessary to change the reference value to the larger value.

When the $\Delta\Delta PM$ is larger than $LPM_1$ ("YES" in step 8), and when the $\Delta\Delta PM$ is also larger than $LPM_2$ ("YES" in step 10), the present correction term PMACC is calculated from the formula (3) (steps 9 and 11). Finally, the corrected intake pressure PMESA is calculated from the formula (4) (step 13). Where the correction factor $\alpha$ is determined with reference to the curve I, for example, $\alpha = 8$ (when PMACC=0) or $\alpha = 4$ (when PMACC ≠0). In this case, since the correction factor α is changed in correspondence with "PMACC=0" or "PMACC≠0", the rising characteristic of the PMESA during the initial acceleration can be improved so that this characteristic can approximate curve I.

Figure 6B:
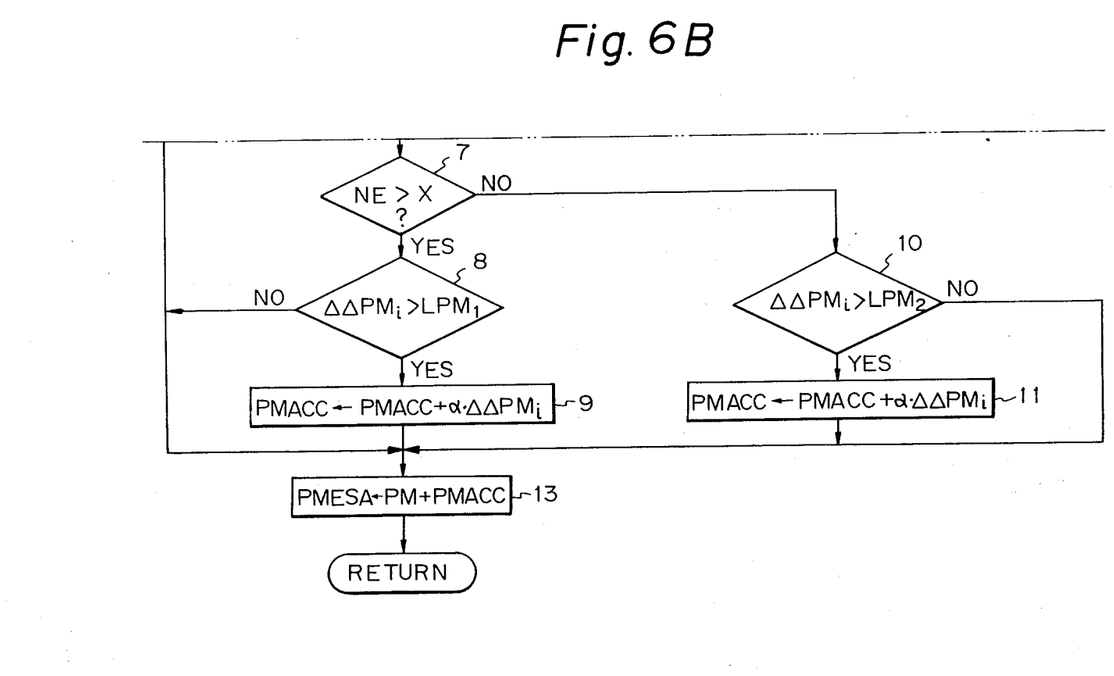
Figure 7:
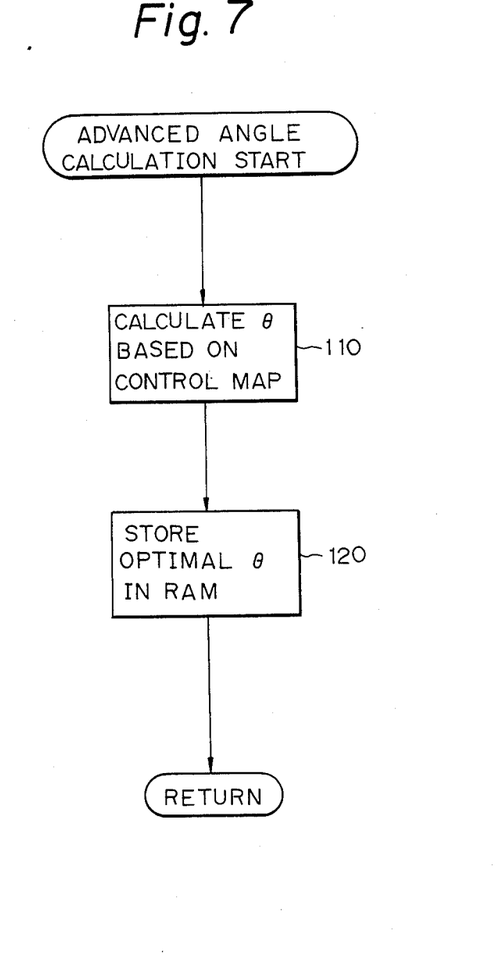
FIG. 7 is a flow chart for explaining calculation of an advanced crank angle.
Figure 8:
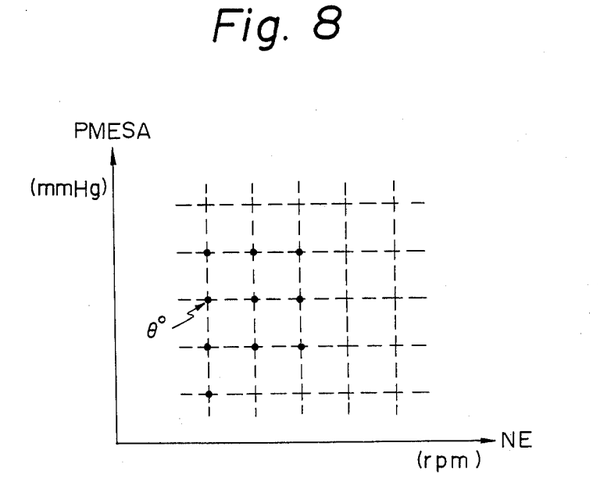
FIG. 8 is a control map of an advanced crank angle based on a corrected intake pressure and an engine rotational speed.

Referring to FIG. 7, the optimal advanced crank angle is obtained from this routine. That is, the corrected intake pressure PMESA can be obtained in the step 13 in FIG. 6B and the engine rotational speed NE is detected from the sensor C. Accordingly, the optimal advanced crank angle θ° is determined from the control map shown in FIG. 8 (step 110). This optimal advanced crank angle is stored temporarily in the RAM 52 (step 120).

Referring to FIG. 8, this control map is previously stored in the ROM 51 and constituted by two dimensions. The ordinate shows the corrected intake pressure PMESA (mm Hg) and the abscissa represents the engine rotational speed NE (rpm). Conventionally, only the intake pressure PM is used instead of the PMESA. The optimal advanced crank angle θ° is obtained by determining the point at which the PMESA and the NE cross.

Figure 10:
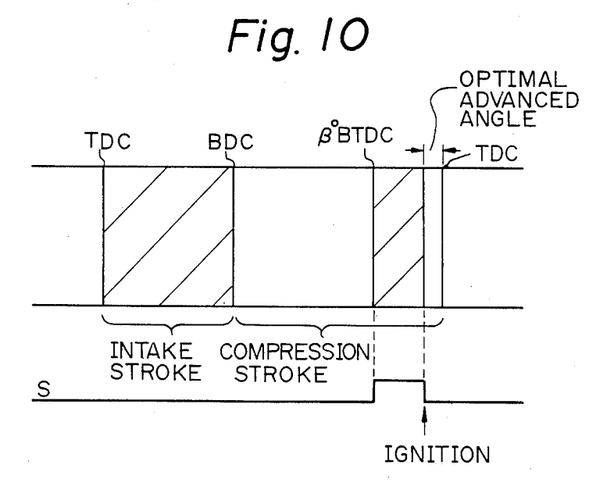
FIG. 10 is a timing chart between crank angle and ignition timing.

Referring to FIG. 9, the ignition timing control routine is shown, and FIG. 10 shows the timing chart of the crank angle and the ignition signal. As shown, when the compression stroke after the intake stroke (between top dead center TDC and bottom dead center BDC) is completed, and the stroke has reached the crank angle β° BTDC (BTDC: before TDC), the ignition command signal S is generated from the electric control circuit 5 to the ignitor IG. β° BTDC can be obtained by adding the optimal advanced crank angle to rotational angles when the signal S is turned ON.

Accordingly, in step 21, (FIG. 9) it is judged whether the stroke has reached β° BTDC or not. That is, the judgement is carried out as to whether or not the ignition command signal S should be output from the ignition command means G shown in FIG. 1. If the stroke has not reached β° BTDC, the ignition command signal is not output (step 23), and if the stroke has reached β° BTDC, the ignition command signal S is output to the ignition IG (step 22).

The current then flows to the primary coil of the ignitor IG based on this signal S. When this ignition command signal S is stopped and the primary current is cut off, a high voltage caused by mutual induction is generated to the secondary coil of the ignitor IG. This high voltage is applied to the ignition plug IP through the distributor DS, and ignition is then performed at an optimal timing.

Figure 11:
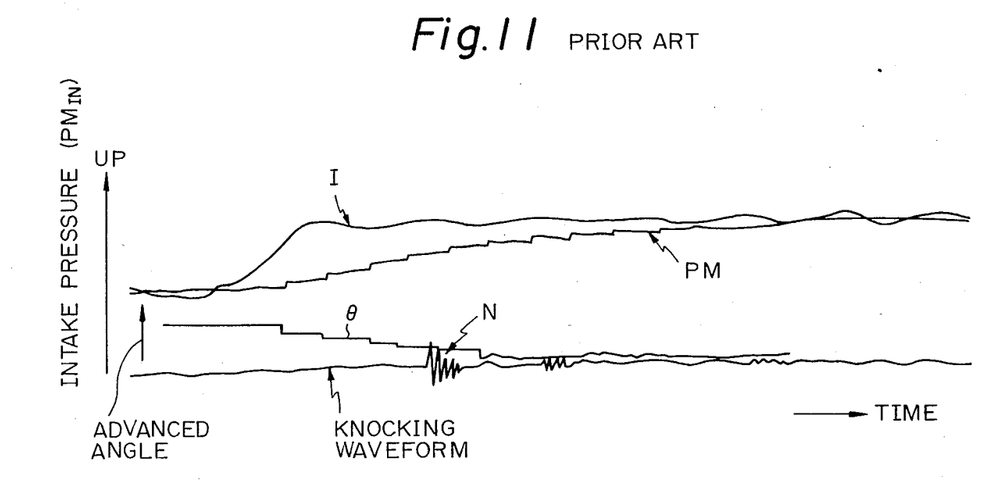
FIG. 11 is a graph for explaining an intake pressure and engine knocking wave in the conventional system.
Figure 12:
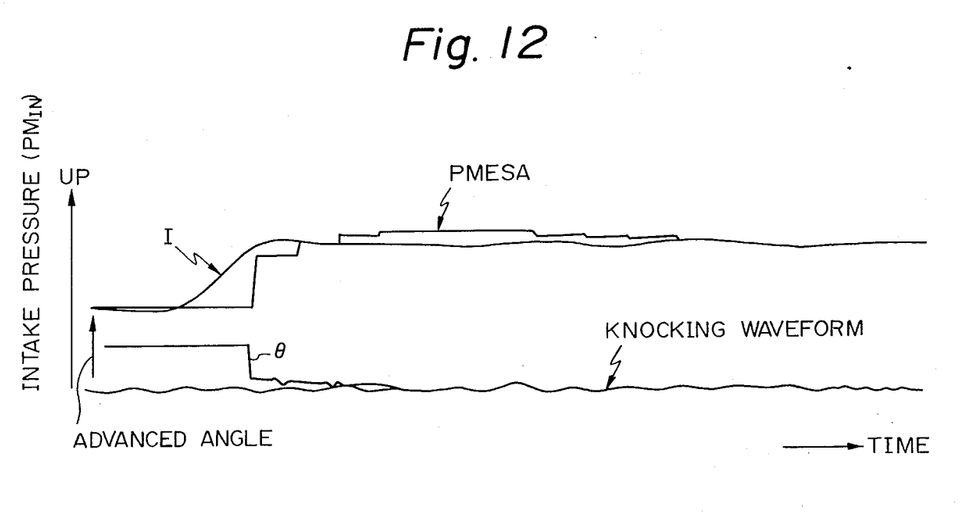
FIG. 12 is a graph for explaining an intake pressure and engine knocking wave in the present invention.

Referring to FIGS. 11 and 12, the ordinate represents intake pressure and the advanced crank angle, and the abscissa represents time. FIG. 11 shows waveforms before correction, i.e., of the conventional system. FIG. 12 shows waveforms after correction, i.e., of the system according to the present invention. In FIG. 11, the waveform of the PM lags behind the curve I. Consequently, the advanced crank angle θ° is not optimal, and therefore, engine knocking occurs as indicated by "N". In FIG. 12, the waveform PMESA is completely matched to the curve I and the advance crank angle θ° does not lag behind these characteristics. Accordingly, an engine knocking wave is not found in the waveform.

We claim:
1. An ignition timing control system for an internal combustion engine comprising:
   a crank angle detection means for detecting a crank angle;
   an engine rotational speed detection means for detecting engine rotational speed;
   an intake pipe air pressure detection means for detecting air pressure in an intake manifold;
   an intake pipe air pressure detection means for calculating a correction term and for obtaining a corrected intake pipe air pressure value, comprising a first difference value calculation means for obtaining a first difference value before and after each period of the intake pipe air pressure, a calculation means for obtaining a second difference value second ond difference value before and after each first difference value, a correction calculation means for obtaining a correction term based on the second difference value and a correction factor, and a corrected pressure calculation means for obtaining the corrected intake pipe air pressure value by adding the correction term, wherein when said second difference value exceeds a predetermined reference value, the correction term corresponding to said second difference value is calculated and added to the intake pipe air pressure;
   an optimal advanced angle calculation means for obtaining an optimal advanced crank angle based on a corrected intake pipe pressure obtained by said intake pipe air pressure correction means and based on an engine rotational speed obtained by said engine rotational speed detection means; and
   an ignition command means for commanding an ON/OFF timing of a primary current of an ignition coil.

2. A system as claimed in claim 1, wherein said first and second difference values are calculated when an idle switch is turned OFF.

3. A system as claimed in claim 1, wherein said predetermined reference value is changed in correspondence with the engine rotational speed.

4. A system as claimed in claim 1, wherein said correction factor is changed in correspondence with the correction term.

5. A system as claimed in claim 1, wherein a constant pressure value is subtracted from the correction term at each period of the intake pipe air pressure.

6. A system as claimed in claim 5, wherein said correction term is treated as zero when said subtraction result is negative.

* * * * *